United States Patent
Hou et al.

(10) Patent No.: US 8,730,141 B2
(45) Date of Patent: May 20, 2014

(54) DISPLAY PIXEL STRUCTURE, LIQUID CRYSTAL PANEL, LIQUID CRYSTAL DISPLAY DEVICE AND DRIVING METHOD

(75) Inventors: Hunglung Hou, Shenzhen (CN); Chengming He, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 184 days.

(21) Appl. No.: 13/319,418

(22) PCT Filed: Sep. 26, 2011

(86) PCT No.: PCT/CN2011/080192
§ 371 (c)(1),
(2), (4) Date: Nov. 8, 2011

(87) PCT Pub. No.: WO2013/040799
PCT Pub. Date: Mar. 28, 2013

(65) Prior Publication Data
US 2013/0069918 A1    Mar. 21, 2013

(51) Int. Cl.
*G09G 3/36* (2006.01)
*G09G 5/00* (2006.01)

(52) U.S. Cl.
USPC .............. 345/88; 345/87; 345/204; 349/108

(58) Field of Classification Search
USPC .............................. 345/204, 87, 88; 349/108
See application file for complete search history.

(56) References Cited

U.S. PATENT DOCUMENTS

2010/0225747 A1* 9/2010 Chen et al. .................. 348/51
2010/0265230 A1* 10/2010 Kang .......................... 345/211

FOREIGN PATENT DOCUMENTS

| CN | 1991469 A | 7/2007 |
|---|---|---|
| CN | 201251657 Y | 6/2009 |
| CN | 101867836 A | 10/2010 |
| CN | 101888564 A | 11/2010 |
| CN | 102081911 A | 6/2011 |
| CN | 202141871 U | 2/2012 |
| JP | 2004-4725 A | 1/2004 |
| JP | 2004-258365 A | 9/2004 |

OTHER PUBLICATIONS

Liu Yali, the International Searching Authority written comments, Jul. 2012, CN.
Zhao Lingling, the first office action, Aug. 2012, CN.

* cited by examiner

*Primary Examiner* — Kevin M Nguyen
*Assistant Examiner* — Kenneth B Lee, Jr.
(74) *Attorney, Agent, or Firm* — IPro, Inc.; Na Xu

(57) ABSTRACT

The present invention discloses a display pixel structure, a liquid crystal panel, a liquid crystal display (LCD) device and a driving method. Said display pixel structure comprises multiple parallel pixel areas; each said pixel area comprises two single rows of first sib-pixel area and second sub-pixel area which are mutually parallel; said second sub-pixel area comprises multiple pixel elements; every three adjacent pixel elements form a group; and the three pixel elements of each group are respectively corresponding to three primary colors. The present invention has the advantages that the corresponding phase retardation coating is not exceeded within the range of wider light; the XTALK problem under the condition of large-angle light is avoided; the viewed color is not changed because the light emitted by each pixel of the second sub-pixel area is not blocked; and higher aperture opening ratio is obtained.

11 Claims, 5 Drawing Sheets

DISPLAY PIXEL STRUCTURE, LIQUID CRYSTAL PANEL, LIQUID CRYSTAL DISPLAY DEVICE AND DRIVING METHOD

TECHNICAL FIELD

The present invention relates to the field of displays, particularly to a display pixel structure, a liquid crystal panel, a liquid crystal display (LCD) device and a driving method.

BACKGROUND

Three dimensional (3D) displays are gradually popular and become the main recreation trends. The key point for creating the 3D effect is that the left eye and the right eye of a person receive different signals so that both the eyes of the person can feel the stereo effect. The polarization 3D is developed on the display screen, as shown in FIG. 1; phase retardation coatings are additionally added on the original display screen; the phase retardation coating corresponding to the left eye is the left-eye phase retardation coating 4, and the phase retardation coating corresponding to the right eye is the right-eye phase retardation coating 5; so that the left-eye and right-eye pixel signals on the screen become different polarized light, and the left eye and the right eye receive different signals by selecting signals through the glasses 8. The polarization 3D has a disadvantage, namely wrong pixel signals will be received when large angles exist in the upper part and the lower part.

As shown in FIG. 2, the key point for achieving clear stereo image is that the left eye can not receive the signal of the right eye, and the right eye can not receive the signal of the left eye. Otherwise, XTALK will be formed. Considering the large-angle light, such as A; the light of the right-eye pixel 31 entering the right-eye phase retardation coating 5 is a correct optical signal. For case B, the light of the right-eye pixel 31 enters the left-eye phase retardation coating 4, which results in XTALK, and affects the effect of the 3D image; namely the 3D visual angle becomes poor.

As shown in FIG. 3, in order to solve the aforementioned problems, the width of a black matrix 6 on the CF glass is increased, and the large-angle light is blocked so that the light can not enter the wrong phase retardation coating, as shown on the mark 61 in FIG. 3. However, the mode can cause the aperture opening ratio of the panel to become small (particularly during two dimensional (2D) operation), and the energy consumption performance to become poor. There is the other mode: changing the range of the pixel light-emitting area 7, and reduce the wrong light to produce and enter the phase retardation coatings. However, in order to control the light-emitting area, two data lines or two gates must be used to independently control the pixels. The cost of IC will be increased, and it does not applicable to the mode of charging sharing. Because charging sharing comprises main area and sub area, there is a voltage relationship between the main area and the sub area. At high gray scale, the sub area will be bright and will not keep the permanent black.

As shown in FIG. 4, the pixels 3 are horizontally arranged in order; each pixel is composed of three colors of RGB, and comprises one gate (namely one gate line) and three data lines. In order to reduce the cost of the data line IC, the 3G1D pixel structure is usually used. As shown in FIG. 5, in the Tri-gate pixel arrangement (3G1D), each pixel 3 is also composed of three colors of RGB, and comprises three gates (namely three gate lines) and one data line. The pixel structure has the advantage that the number of the data line IC can be reduced, but has the problem when the Tri-gate pixels (3G1D) are matched with the polarization 3D: for example, the black matrix 6 must be used to prevent the signal of the junction of the left eye and right eye from entering the wrong phase retardation coating; as shown in FIG. 6, because the specific color is blocked at this moment, the viewed color is changed (the upper pixel lacks blue, and the lower pixel lacks red).

SUMMARY

The aim of the present invention is to provide a display pixel structure, a liquid crystal panel, a LCD device and a driving method thereof with high aperture opening ratio, low XTALK, no change of viewed color and high universality.

The purpose of the present invention is achieved by the following technical schemes.

A display pixel structure, wherein said display pixel structure comprises multiple parallel pixel areas; each said pixel area comprises two single rows of first sub-pixel area and second sub-pixel area which are mutually parallel; said second sub-pixel area comprises multiple pixel elements; every three adjacent pixel elements form a group; and the three pixel elements of each group are respectively corresponding to three primary colors.

Preferably, the colors of every two adjacent pixel elements of said second sub-pixel area are different; said first sub-pixel area comprises multiple pixel elements; every two adjacent pixel elements form a group; and the colors of two pixel elements of each group are the same; the pixel elements of each group of said first sub-pixel area and its two adjacent pixel elements of the second sub-pixel area are respectively corresponding to three primary colors. Two pixel elements in one group of the first sub-pixel area and two adjacent pixel elements of the second sub-pixel area can form a new pixel. Thus, the other pixel can be formed on the premise that the pixel structure is not changed; a more flexible pixel control mode can be provided; particularly during 2D display, the aperture opening ratio can be further increased because the first sub-pixel area can be used for display as well.

A liquid crystal panel comprises a display pixel structure; said display pixel structure comprises multiple parallel pixel areas; each said pixel area comprises two single rows of first sub-pixel area and second sub-pixel area which are mutually parallel; said second sub-pixel area comprises multiple pixel elements; every three adjacent pixel elements form a group; and the three pixel elements of each group are respectively corresponding to three primary colors; each said pixel element comprises a pixel electrode for controlling the display of each pixel element. Said liquid crystal panel also comprises one or more scan lines used for driving one or more pixel electrodes, and comprises one or more data lines for controlling one or more pixel electrodes.

Preferably, each said pixel area is corresponding to at least one scan line and multiple data lines, and each said data line is corresponding to at least one pixel electrode of the second sub-pixel area. In the 3D display mode, the second sub-pixel areas are used as the display part; each second sub-pixel area is driven by at least one scan line; each data line is corresponding to at least one pixel electrode of the second sub-pixel areas: for example, each pixel electrode of the second sub-pixel areas is corresponding to one data line, and then each pixel is controlled by three data lines; because each data line must pass through the middle of two pixel electrodes, two pixel electrodes can be controlled by one data line, and then the number of the data line IC can be reduced and the cost can be reduced.

Preferably, the colors of every two adjacent pixel elements of each said second sub-pixel area are different; said first sub-pixel area comprises multiple pixel elements; every two adjacent pixel elements form a group; and the colors of two pixel elements of each group are the same; the pixel elements of each group of said first sub-pixel area and its two adjacent pixel elements of the second sub-pixel area are respectively corresponding to three primary colors; each pixel area comprises three scan lines; two pixel elements of each group of the first sub-pixel area and two adjacent pixel electrodes of the pixel elements of each second sub-pixel area are corresponding to one data line, namely the data line passes through the middle of two pixel elements of each group of the first sub-pixel area and controls four pixel electrodes of the first sub-pixel area and the second sub-pixel area. Two pixel elements of each group of the first sub-pixel area and two adjacent pixel elements of the second sub-pixel area form a new pixel. Thus, the formation of the other pixel can be artificially defined on the premise of not changing the pixel structure, and a more flexible pixel control mode can be provided. During 2D display in particular, the aperture opening ratio can be further increased because the first sub-pixel area can be used for display as well. In control, each pixel is controlled by two scan lines and two data lines during 3D display, while the new pixel which is suitable for 2D display is controlled by three scan lines and one data line. Thus, the number of data lines can be reduced, and then the number of data line IC can be reduced and the cost can be saved.

Preferably, the width of each pixel element of said first sub-pixel area is half of the width of each pixel element of said second sub-pixel area. Two pixel elements of each group of the first sub-pixel area and two adjacent pixel elements of the second sub-pixel area are defined as a pixel. Under the circumstances, there are two pixel elements for controlling the same color, and there are two pixel electrodes for respectively controlling the other two colors of the three primary colors (red, green, and blue). In order to ensure the display quality of the pixel, the width of each pixel electrode of said first sub-pixel area is half of the width of each pixel electrode of said second sub-pixel area to ensure that the areas of the electrodes which respectively control the three primary colors (red, green, and blue) are consistent. Therefore, the influence of the electrode areas on the display gamma is not considered during display drive, and the control mode is simplified.

A LCD device comprises the aforementioned liquid crystal panel.

A liquid crystal pixel driving method comprises the following steps:

A: Controlling each scan line of each first sub-pixel area not to operate, and polling and driving each scan line of each second sub-pixel area; and driving the corresponding data line by using the three adjacent pixel elements which are respectively corresponding to three primary colors of the second sub-pixel area as a pixel.

Preferably, the method also comprises the following steps before said step A:

O: Determining whether the displayed signal is 2D signal or 3D signal, if the signal is a 3D signal, return to step A, and go to the 3D display mode; if the signal is a 2D signal, return to step B, and go to 2D display mode; and B: Polling and scanning all the scan lines of each first sub-pixel area and each second sub-pixel area; and driving the corresponding data line by using two pixel elements of each group of the first sub-pixel area and the two adjacent pixel elements of the second sub-pixel area as a pixel. In said step A, the scan line of the first sub-pixel area is controlled not to operate. Therefore, the first pixel area does not have display. A strip-shaped black domain is formed on the LCD panel, the phase retardation coatings are arranged in each corresponding pixel area; spatially, each second sub-pixel area is positioned in the middle of the phase retardation coatings, and the black domains formed by two first pixel areas are arranged on both sides. Thus, the light emitted by the pixel of the second sub-pixel area will not exceed the range of the corresponding phase retardation coating, and the problem of large-angle light XTALK is solved. In addition, because the light emitted by the pixel of the second sib-pixel area is not blocked, the viewed color will not be changed, and higher aperture opening ratio will be obtained. In said step B, two pixel elements of the first sub-pixel area of each said group of the second sub-pixel area and the corresponding two pixel electrodes of the second sub-pixel area are defined as a pixel. Thus, each first pixel area also participates in the display so that the aperture opening ratio of the liquid crystal panel is further increased, and the display quality during the 2D display is promoted.

Because each pixel area of the display pixel structure used by liquid crystal panel of the present invention is divided into first sub-pixel area and second sub-pixel area, and the first sub-pixel area is controlled not to display during 3D display, multiple strips of black domains are formed on the liquid crystal panel, each second sub-pixel area between two black domains is permitted not to exceed the corresponding phase retardation coating within wider light range, and the problem of XTALK under the condition of large-angle light is avoided. Because the light emitted by the pixel of the second sub-pixel area is not blocked, higher aperture opening ratio will be obtained, and the viewed color will not be changed because the pixel structure is still of the complete three primary colors structure.

Wherein: 1. data line; 2. scan line 3. pixel; 31. left-eye pixel; 32. right-eye pixel; 33. pixel element; 4. left-eye phase retardation coating; 5. right-eye phase retardation coating; 6. black matrix; 7. pixel light-emitting area; 8. polaroid glasses; 9. pixel area; 91. the first sub-pixel area; 92. the second sub-pixel area.

DETAILED DESCRIPTION

The present invention will further be described in detail in accordance with the figures and the preferred embodiments.

Figure 1:
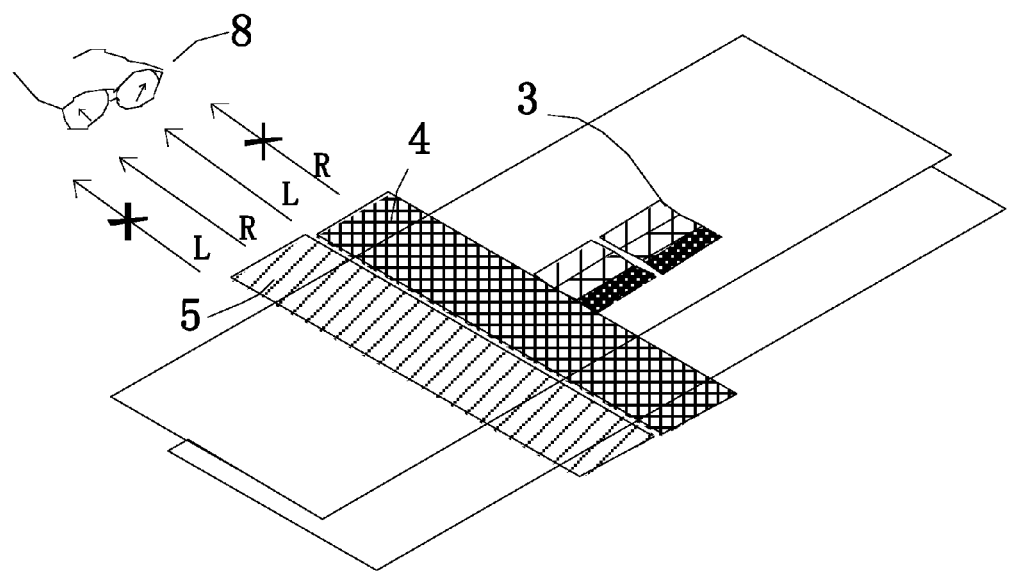
FIG. 1 is the schematic diagram of the 3D display.
Figure 2:
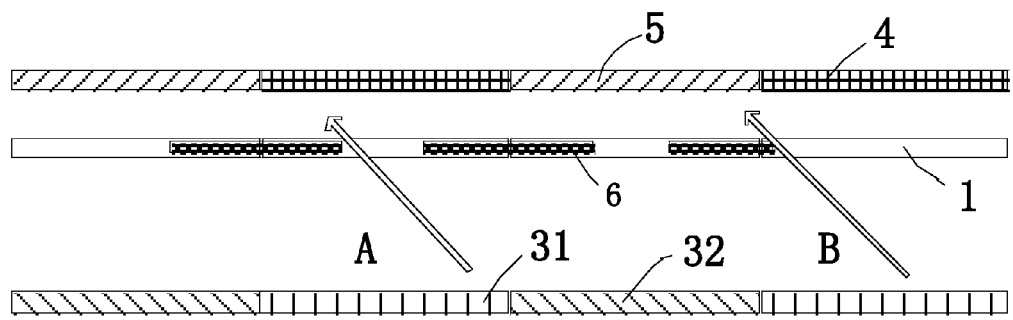
FIG. 2 is the schematic diagram of the liquid crystal panel of the existing 3D display.
Figure 3:
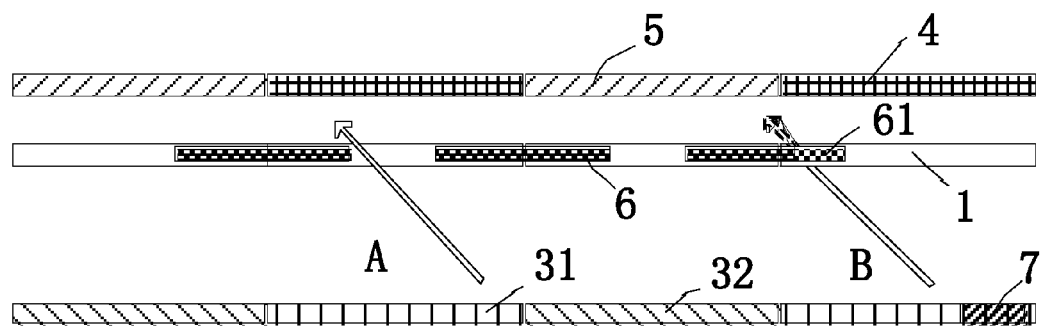
FIG. 3 is the schematic diagram of solving the XTALK problem of the existing 3D display.
Figure 4:
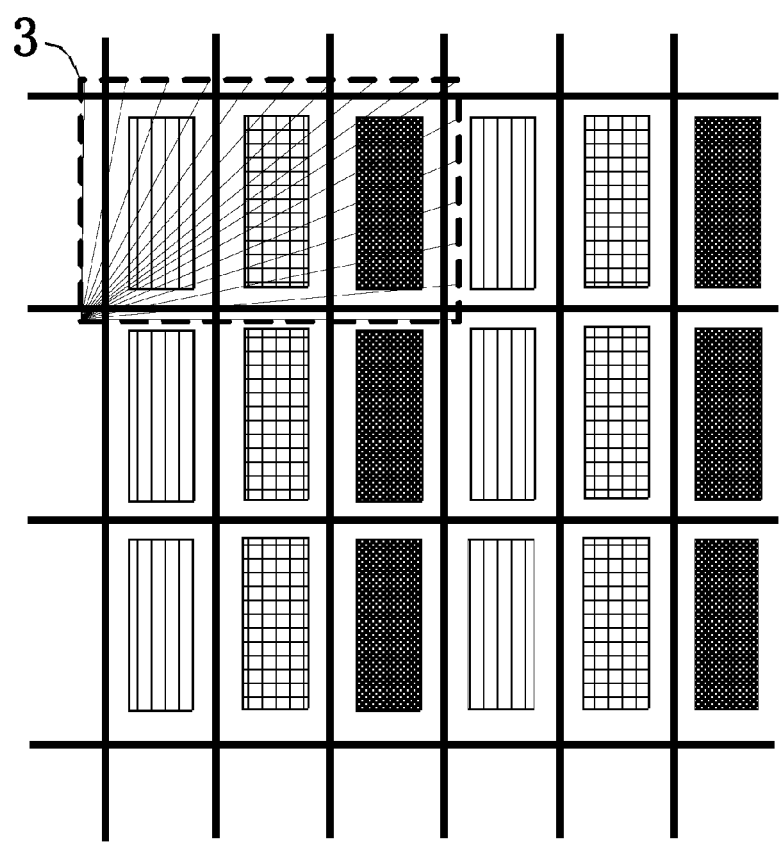
FIG. 4 is the schematic diagram of an existing pixel structure, and each pixel comprises one gate and three data lines.
Figure 5:
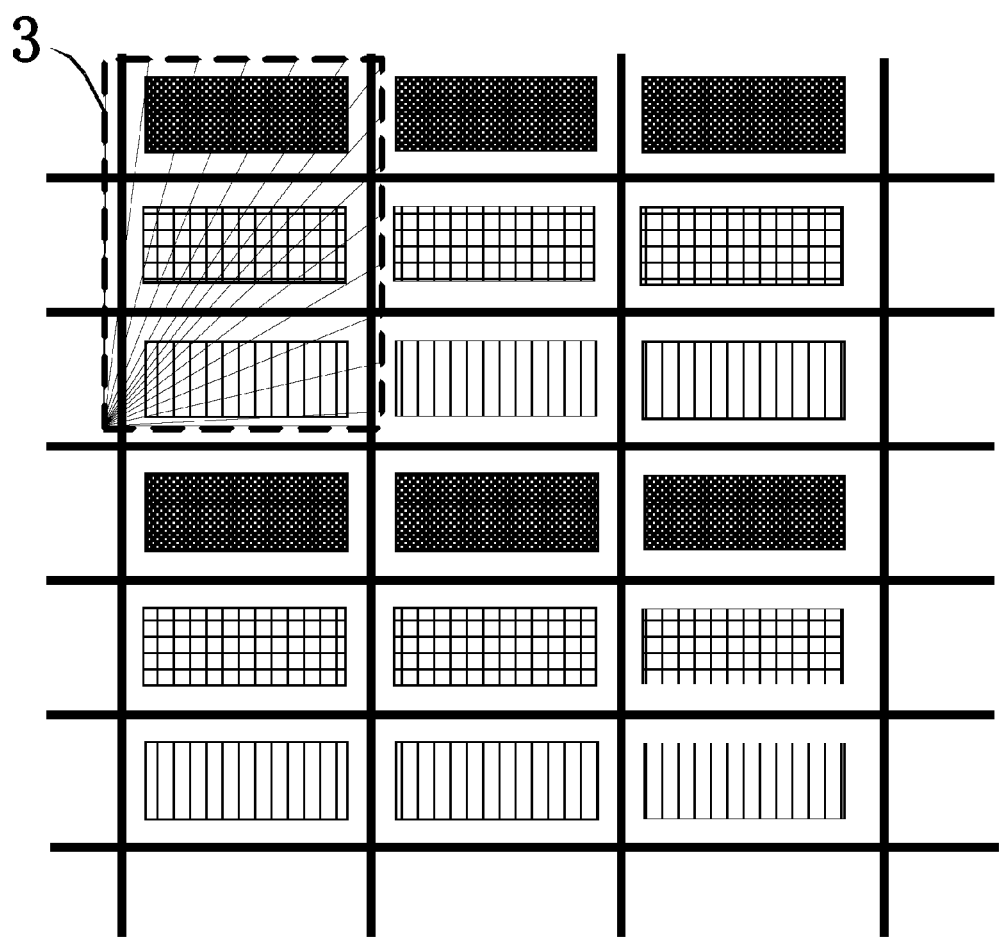
FIG. 5 is the schematic diagram of the other existing pixel structure, and each pixel comprises three gates and one data line (3G1D)
Figure 6:
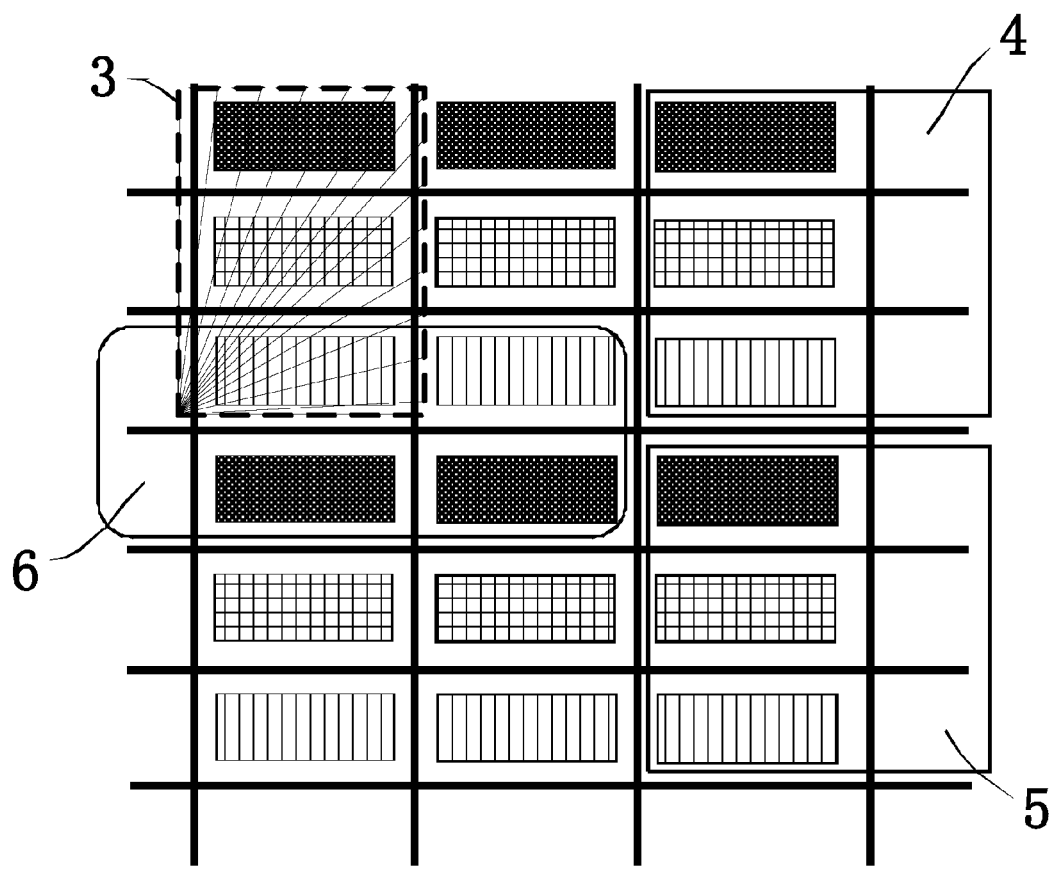
FIG. 6 is the schematic diagram of the existing 3G1D pixel structure with the problem during 3D display.
Figure 7:
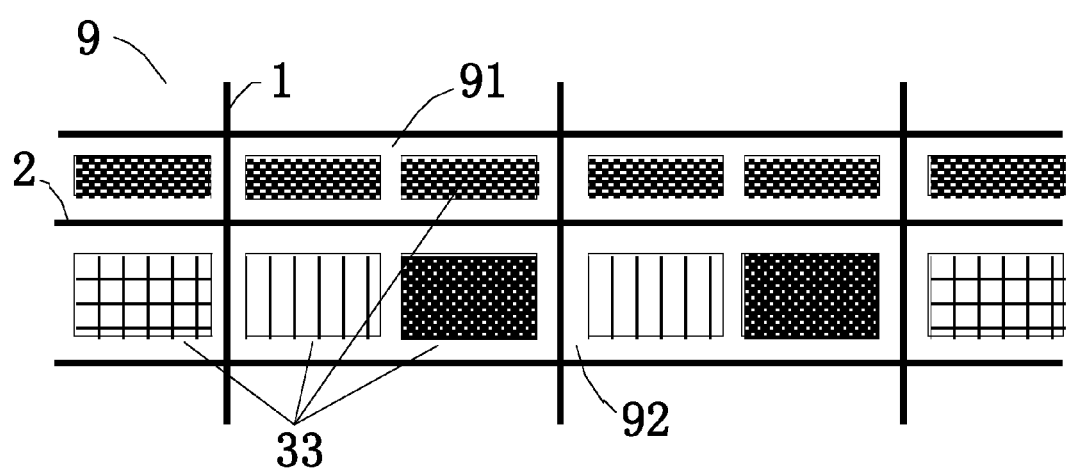
FIG. 7 is the schematic diagram of the pixel structure of the present invention.
Figure 8:
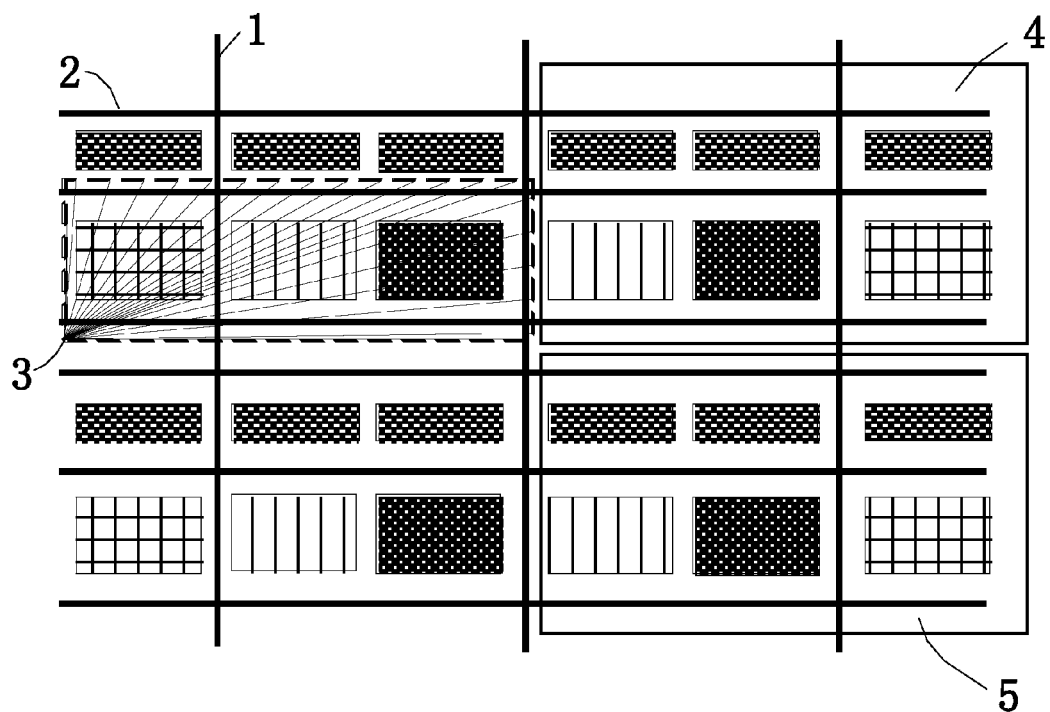
FIG. 8 is the schematic diagram of the pixel structure of the present invention during 3D display.

A LCD device comprises a liquid crystal panel, wherein the liquid crystal panel uses a display pixel structure which can be used for 3D display; said display pixel structure comprises multiple parallel pixel areas 9; each said pixel area 9 comprises two single rows of first sub-pixel area 91 and second sub-pixel area 92 which are mutually parallel; said second sub-pixel area 92 comprises multiple pixel elements 33; every three adjacent elements 33 form a group; the three pixel elements 33 of each group are respectively corresponding to three primary colors. Thus, the three pixel elements 33 of each group are defined as a pixel 3 (as shown in FIG. 8). Each said pixel element 33 comprises a pixel electrode for controlling the display of each pixel element 33. Said liquid crystal panel also comprises one or more scan lines 2 connected with the control end of the pixel electrode and one or more data lines 1 connected with the input end of the pixel electrode. In order to produce the 3D display effect, each position of said liquid crystal panel corresponding to each said pixel area 9 is provided with a phase retardation coating; two adjacent phase retardation coatings are respectively used for producing left-eye polarized light and right-eye polarized light.

Furthermore, each said pixel area 9 is corresponding to at least one scan line 2 and multiple data lines 1, and each said data line 1 is corresponding to at least one pixel electrode of the second sub-pixel area 92. During 3D display, the second sub-pixel areas 92 are used as the display part; each second sub-pixel area 92 is driven by at least one scan line 2; and each data line 1 is corresponding to at least one pixel electrode of the second sub-pixel area 92. For example, each pixel electrode of the second sub-pixel areas 92 is corresponding to one data line, and then each pixel 3 is controlled by three data lines 1; because each data line 1 must pass through the middle of two pixel electrodes, two pixel electrodes can be controlled by one data line 1, and then the number of the data line IC can be reduced and the cost can be reduced.

Figure 9:
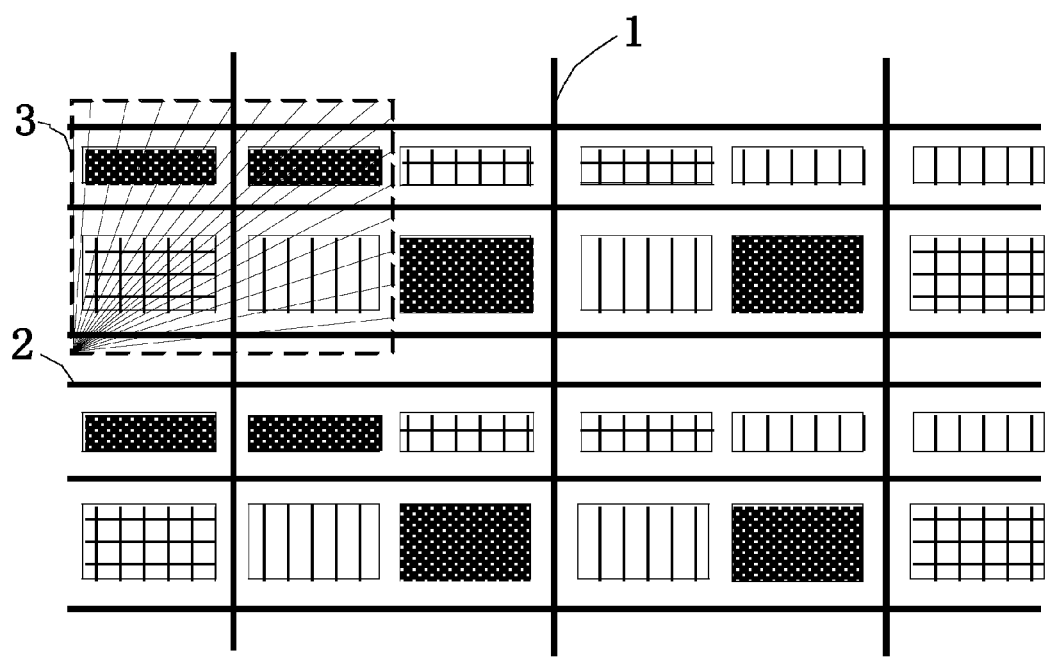
FIG. 9 is the schematic diagram of the pixel structure of the present invention during 2D display.

Furthermore, in order to be compatible with the 2D display, the colors of every two adjacent pixel elements 33 of said second sub-pixel area 92 are different; said first sub-pixel area 91 comprises multiple pixel elements 33; every two adjacent pixel elements 33 form a group; and the colors of two pixel element 33 of each group are the same; the pixel element 33 of each group of said first sub-pixel area 91 and its two adjacent pixel elements 33 of the second sub-pixel area 92 are respectively corresponding to three primary colors; each pixel area 9 comprises three scan lines 2; two pixel elements 33 of each group of the first sub-pixel area and two adjacent pixel electrodes of the pixel elements 33 of the second sub-pixel areas 92 are corresponding to one data line 1, namely the data line 1 passes through the middle of two pixel elements 34 of each group of the first sub-pixel area and controls four pixel electrodes of the first sub-pixel area 91 and the second sub-pixel area 92. Two pixel elements 33 of each group of the first sub-pixel area and two adjacent pixel elements 33 of the second sub-pixel area 92 are defined as anew pixel 3 (as shown in FIG. 9). Thus, the formation of the other pixel 3 can be artificially defined on the premise of not changing the pixel 3 structure, and a more flexible control mode of the pixel 3 can be provided. During 2D display in particular, because each first sub-pixel area 91 can be used for display as well, the aperture opening ratio can be further increased. In control, the pixel 3 is controlled by two scan lines 2 and two data lines 1 during 3D display, while the new pixel 3 which is suitable for 2D display is controlled by three scan lines 2 and one data line 1. Thus, the number of data lines 1 can be reduced, and then the number of data line IC can be reduced and the cost can be saved.

Preferably, the width of each pixel element 33 of said first sub-pixel area 91 is half of the width of each pixel element 33 of said second sub-pixel area 92. Two pixel elements 33 of each group of the first sub-pixel area and two adjacent pixel elements 33 of the second sub-pixel area 92 are defined as a pixel 3. Under the circumstances, there are two pixel elements for controlling the same color, and there are two pixel electrodes for respectively controlling the other two colors of the three primary colors (red, green, and blue). In order to ensure the display quality of the pixel 3, the width of each pixel electrode of said first sub-pixel area 91 is half of the width of each pixel electrode of said second sub-pixel area 92 to ensure that the areas of the electrodes which respectively control the three primary colors (red, green, and blue) are consistent. Therefore, the influence of the electrode areas on the display gamma is not considered during display drive, and the control mode is simplified. Of course, the width of each pixel element 33 of the first sub-pixel area 91 can be designed in accordance with specific conditions, and even can be designed into the same width as the pixel element 33 of the second sub-pixel area 92.

The LCD device of the present invention can use the 3G1D pixel 3 structure during 2D display; while during 3D display, the phenomenon that light enters wrong phase retardation coating is reduced by closing the first pixel area 9. By using the pixel 3 structure, less 3G1D data line IC cost is guaranteed; the switching between 2D and 3D is performed without using the BM light blocking method which causes too much loss of the aperture opening ratio.

The aforementioned liquid crystal pixel driving method comprises the following steps:

A: Polling and driving each scan line 2 of each second sub-pixel area 92; and driving the corresponding data line 1 by using three adjacent pixel elements 33 which are respectively corresponding to three primary colors of the second sub-pixel area 92 as a pixel 3.

In order to be compatible with the displays of the 2D and 3D signals, the method also comprises the following steps before said step A:

O: Determining whether the displayed signal is 2D signal or 3D signal, if the signal is a 3D signal, return to step A, and go to the 3D display mode; if the signal is a 2D signal, return to step B, and go to 2D display mode:

A: Polling and driving each scan line 2 of each second sub-pixel area 92; and driving the corresponding data line by using three adjacent pixel elements 33 which are respectively corresponding to three primary colors of the second sub-pixel area 92 as a pixel 3, and finishing the process;

B: Arranging three scan lines 2 in each pixel area 9, and polling and scanning all the scan lines 2; and driving the corresponding data line 1 by using two pixel elements 33 of the first sub-pixel area of each group and the two adjacent pixel elements 33 of the second sub-pixel areas 92 as a pixel, and finishing the process.

In step A, each scan line 2 of the first sub-pixel area 91 is controlled not to operate. Thus, the first pixel area 9 does not have display, and then a strip-shaped black domain is formed on the LCD panel. The phase retardation coatings are arranged in each corresponding pixel area 9; spatially, each second sub-pixel area 92 is positioned in the middle of the phase retardation coatings, and the black domain formed by two first pixel areas 9 is arranged on both sides. Thus, the light emitted by the pixel 3 of the second sub-pixel area 92 will not exceed the range of the corresponding phase retardation coating, and the problem of large-angle light XTALK is solved. In addition, because the light emitted by the pixel 3 of the second sub-pixel area 92 is not blocked, the viewed color will not be changed, and higher aperture opening ratio will be obtained.

In said step B, two pixel elements 34 of the first sub-pixel area of each said group of the second sub-pixel area 92 and the corresponding two pixel electrodes of the second sub-pixel area 92 are defined as a pixel 3. Thus, the first pixel area 9 also participates in the display so that the aperture opening ratio of the liquid crystal panel is further increased, and the display quality during the 2D display is promoted.

Because each pixel area 9 of the present invention is divided into first sub-pixel area 91 and second sub-pixel area 92, and the first sub-pixel area 91 is controlled not to display during 3D display; multiple black domains are formed on the liquid crystal panel; the second sub-pixel area 92 between two black domains is permitted not to exceed the corresponding phase retardation coating within wider light range; the problem of XTALK under the condition of large-angle light is avoided; and the light emitted by the pixel 3 of the sub-pixel area 92 is not blocked. Thus, the viewed color will not be changed, and higher aperture opening ratio will be obtained.

The present invention is described in detail in accordance with the above contents with the specific preferred embodiments. However, this invention is not limited to the specific embodiments. For the ordinary technical personnel of the technical field of the present invention, on the premise of keeping the conception of the present invention, the technical personnel can also make simple deductions or replacements, and all of which should be considered to belong to the protection scope of the present invention.

We claim:

1. A display pixel structure, comprising: multiple parallel pixel areas; each said pixel area comprises two single rows of first sub-pixel area and second sub-pixel area which are mutually parallel; said second sub-pixel area comprises multiple pixel elements; every three adjacent pixel elements form a group, and the three pixel elements of each group are respectively corresponding to three primary colors;

wherein the colors of every two adjacent pixel elements of said second sub-pixel area are different; said first sub-pixel area comprises multiple pixel elements; every two adjacent pixel elements of the first sub-pixel area form a group; and the colors of two pixel elements of each group of the first sub-pixel area are the same; the two pixel elements of each group of said first sub-pixel area and its two adjacent pixel elements of the second sub-pixel area are respectively corresponding to three primary colors.

2. The display pixel structure of claim 1, wherein the width of each pixel element of said first sub-pixel area is half of the width of each pixel element of said second sub-pixel area.

3. A liquid crystal panel, comprising: a display pixel structure; said display pixel structure comprises multiple parallel pixel areas; each said pixel area comprises two single rows of first sub-pixel area and second sub-pixel area which are mutually parallel; said second sub-pixel area comprises multiple pixel elements; every three adjacent pixel elements form a group; and the three pixel elements of each group are respectively corresponding to three primary colors; each said pixel element comprises a pixel electrode for controlling the display of each pixel element; said liquid crystal panel also comprises one or more scan lines used for driving one or more pixel electrodes, and one or more data lines for controlling one or more pixel electrodes; wherein the colors of every two adjacent pixel elements of said second sub-pixel area are different; said first sub-pixel area comprises multiple pixel elements; every two adjacent pixel elements of the first sub-pixel area form a group; and the colors of two pixel elements of each group of the first sub pixel area are the same; the pixel elements of each group of said first sub-pixel area and its two adjacent pixel elements of the second sub-pixel area are respectively corresponding to three primary colors.

4. The liquid crystal panel of claim 3, wherein each said pixel area is corresponding to at least one scan line and multiple data lines, and each said data line is corresponding to at least one pixel electrode of the second sub-pixel area.

5. The liquid crystal panel of claim 4, wherein each pixel area comprises three scan lines; and two pixel elements of each group of the first sub-pixel area and two adjacent pixel electrodes of the pixel elements of the second sub-pixel areas are corresponding to one data line.

6. The liquid crystal panel of claim 5, wherein the width of each pixel element of said first sub-pixel area is half of the width of each pixel element of said second sub-pixel area.

7. A liquid crystal display (LCD) device comprising a display pixel structure, said display pixel structure comprises multiple parallel pixel areas; each said pixel area comprises two single rows of first sub-pixel area and second sub-pixel area which are mutually parallel; said second sub-pixel area comprises multiple pixel elements; every three adjacent pixel elements form a group; and the three pixel elements of each group are respectively corresponding to three primary colors; each said pixel element comprises a pixel electrode for controlling the display of each pixel element; said liquid crystal panel also comprises one or more scan lines for driving one or more pixel electrodes, and one or more data lines for controlling one or more pixel electrodes; wherein the colors of every two adjacent pixel elements of said second sub-pixel area are different; said first sub-pixel area comprises multiple pixel elements; every two adjacent pixel elements of the first sub-pixel area form a group; and the colors of two pixel elements of each group of the first sub-pixel area are the same; the pixel elements of each group of said first sub-pixel area and its two adjacent pixel elements of the second sub-pixel area are respectively corresponding to three primary colors.

8. The LCD device of claim 7, wherein each said pixel area is corresponding to at least one scan line and multiple data lines, and each said data line is corresponding to at least one pixel electrode of the second sub-pixel area.

9. The LCD device of claim 8, wherein each pixel area comprises three scan lines; and two pixel elements of each group of the first sub-pixel area and two adjacent pixel electrodes of the pixel elements of the second sub-pixel areas are corresponding to one data line.

10. The LCD device of claim 9, wherein a width of each pixel element of said first sub-pixel area is half of a width of each pixel element of said second sub-pixel area.

11. A liquid crystal pixel driving method comprises the following steps:

A: polling and driving each scan line of each second sub-pixel area; and driving the corresponding data line by using three adjacent pixel elements respectively corresponding to three primary colors of the second sub-pixel area as a pixel;

B: polling and scanning all the scan lines of the first sub-pixel areas and the second sub-pixel areas parallel to the first sub-pixel areas; and driving the corresponding data line by using two pixel element of the first sub-pixel area of each group and the adjacent two pixel elements of the second sub-pixel area as a pixel; wherein the colors of every two adjacent pixel elements of said second sub-pixel area are different; said first sub-pixel area comprises multiple pixel elements; every two adjacent pixel elements of the first sub-pixel area form a group; and the colors of two pixel elements of each group of the first sub-pixel area are the same; the pixel elements of each group of said first sub-pixel area and its two adjacent pixel elements of the second sub-pixel area are respectively corresponding to three primary colors;

O: determining whether the displayed signal is two-dimensional (2D) signal or three dimensional (3D) signal; if the signal is a 3D signal, return to step A, and go to the 3D display mode; if the signal is a 2D signal, return to step B, and go to 2D display mode.

\* \* \* \* \*